United States Patent
Ercan et al.

(10) Patent No.: US 9,973,993 B2
(45) Date of Patent: *May 15, 2018

(54) SYSTEM AND METHOD FOR PROGRAMMABLE JOINT OPTIMIZATION OF MOBILITY LOAD BALANCING AND MOBILITY ROBUSTNESS OPTIMIZATION

(71) Applicant: NETSIA, INC., Sunnyvale, CA (US)

(72) Inventors: Ali Ozer Ercan, San Jose, CA (US); Mehmet Oguz Sunay, San Francisco, CA (US)

(73) Assignee: NETSIA, INC., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/591,971

(22) Filed: May 10, 2017

(65) Prior Publication Data

US 2017/0332302 A1 Nov. 16, 2017

Related U.S. Application Data

(60) Provisional application No. 62/334,416, filed on May 10, 2016.

(51) Int. Cl.
*H04W 36/22* (2009.01)
*H04W 36/30* (2009.01)
(Continued)

(52) U.S. Cl.
CPC ....... *H04W 36/22* (2013.01); *H04W 36/0088* (2013.01); *H04W 36/30* (2013.01); *H04W 24/02* (2013.01); *H04W 84/18* (2013.01)

(58) Field of Classification Search
CPC . H04W 36/22; H04W 36/0088; H04W 36/30; H04W 24/02; H04W 84/18
See application file for complete search history.

(56) References Cited

U.S. PATENT DOCUMENTS 8,428,610 B2 4/2013 Chowdhury et al.
8,738,004 B2 5/2014 Amirijoo et al.
(Continued)

FOREIGN PATENT DOCUMENTS

WO 2013072271 5/2013

OTHER PUBLICATIONS

"Evolved Universal Terrestrial Radio Access (E-UTRA); Radio Resource Control (RRC); Protocol specification," Technical Specification TS36.331, ver.10.7.0, Release 10, Nov. 2012, 307pgs.
(Continued)

*Primary Examiner* — Dinh P Nguyen
(74) *Attorney, Agent, or Firm* — IP Authority, LLC; Ramraj Soundararajan (57) ABSTRACT

A joint optimization module (jointly optimizing MRO and MLB) includes: (a) an interpolator receiving a measurement report containing: signal strength/quality values, other performance indicator values, and load values reported by each base station; identifying one or more time instances that lack measurements (of signal strength/quality, performance indicator, or load values), and interpolating values for such time instances; (b) a storage unit storing the received measurement report and interpolated measurement values; (c) a MLB unit receiving the measurement report and outputting optimized HO parameters from a load balancing perspective to an optimizer; (d) a MRO unit receiving the measurement report and outputting optimized HO parameters based on reducing HO related link failures; and (e) an optimizer optimizing, jointly for both MLB and MRO, one or more HO parameters per user group based on the stored measurement reports and interpolated measurement values, the MLB module output, and the MRO module output.

20 Claims, 8 Drawing Sheets

(51) Int. Cl.
*H04W 36/00* (2009.01)
*H04W 24/02* (2009.01)
*H04W 84/18* (2009.01)

(56) References Cited

U.S. PATENT DOCUMENTS

| | | |
|---|---|---|
| 8,954,071 B2 | 2/2015 | Klatt et al. |
| 8,995,262 B2 | 3/2015 | Chowdhury et al. |
| 9,055,501 B2 | 6/2015 | Ekemark |
| 2004/0147267 A1* | 7/2004 | Hill ................ H04W 64/00 455/441 |
| 2009/0163223 A1 | 6/2009 | Casey |
| 2011/0176424 A1 | 7/2011 | Yang et al. |
| 2011/0274094 A1* | 11/2011 | Jovicic ............. G01S 5/0252 370/338 |
| 2013/0003548 A1 | 1/2013 | Sridhar et al. |
| 2014/0004862 A1 | 1/2014 | Ekemark |
| 2015/0031360 A1 | 1/2015 | Choi et al. |
| 2015/0189533 A1 | 7/2015 | Fehske et al. |
| 2016/0360462 A1* | 12/2016 | Chockalingam ...... H04W 36/30 |

OTHER PUBLICATIONS

Evolved Universal Terrestrial Radio Access Network (E-UTRAN); Self-configuring and self-optimizing network (SON) use cases solutions, Technical Report TR36.902, ver 9.3.1, Release 9, May 2011, 23pgs.

"Evolved Universal Terrestrial Radio Access (E-UTRAN); User Equipment (UE) procedures in idle mode," Technical Specification TS136.304, ver 8.3.0, Release 8, Nov. 2008, 30 pgs.

Lateef et al., "LTE-Advanced Self-Organising Network Conflicts and Coordination Algorithms," IEEE Wireless Communications, 22(3), Jun. 2015, pp. 108-117.

* cited by examiner

SYSTEM AND METHOD FOR PROGRAMMABLE JOINT OPTIMIZATION OF MOBILITY LOAD BALANCING AND MOBILITY ROBUSTNESS OPTIMIZATION

RELATED APPLICATIONS

This application claims the benefit of provisional application 62/334,416 filed May 10, 2016.

BACKGROUND OF THE INVENTION

Field of Invention

The present application pertains to programmable joint optimization of self-organizing network (SON) functions of mobility load balancing and mobility robustness optimization in wireless broadband communication systems.

Discussion of Related Art

The patent publication US 2015/0031360 A1 presents method and device for Mobility Load Balancing (MLB) in a wireless communication system, using statistical information obtained from the base stations, in order not to deteriorate handover success rate. The loads of at least one cell managed by the base station and at least one neighboring cell are measured. At least one candidate cell and one target cell are selected to perform MLB application. The selection is based on the absolute difference between the base station loads or based on the ratio of their loads. At least one user equipment (UE) is selected for cell individual offset (CIO) parameter change. The method further includes mobility robustness optimization (MRO) functionality's information by removing some base stations from the candidate set of targets based on this information.

The patent publication US 2015/0189533 A1 presents a method for the joint optimization of MLB and coverage and capacity optimization (CCO). Using the received power from the UEs as feedback, optimal partitioning of the served area and optimal BS loads are found jointly. Several metrics such as received power, SINR, etc., for computing coverage and BS load are specified. BS physical parameters and CIO parameters are jointly optimized by iterative direct search.

The U.S. Pat. No. 8,428,610 B2 and U.S. Pat. No. 8,995,262 B2 both disclose method and systems for providing a load factor for load balancing in a communication network. The load factor is aimed to be used in determining the load distribution of network elements, determining the need for load balancing and finding the candidate elements to hand-off the load to, and determining how the load is balanced between network elements. The load factor depends on the load conditions, mainly of the MME, which includes information on at least one of processing unit usage, memory usage, number of active sessions and memory in operative communication with the processing unit. MME function periodically monitors and stores the load conditions in real time and notifies the eNodeBs and other network elements whenever conditions change.

The U.S. Pat. No. 8,738,004 B2 discloses a method and apparatus for excluding the statistics of handover and radio link failures due to non-mobility handover events, such as due to load balancing, cell maintenance, cell outage, etc., in the MRO functionality. The key performance indicators (KPI) related to mobility are also computed with excluding the statistics due to non-mobility handover events. The patent proposes a non-mobility causation filter to determine handover issues due to non-mobility events. This way, only handover events that are not related to non-mobility events are fed into the MRO.

The patent publication US 2014/0004862 A1 and the U.S. Pat. No. 9,055,501 B2 both disclose a method and node supporting cell reselection in a load-balanced network. The aim is to reduce inter-frequency cell reselections when UEs go between connected and idle modes. When there are overlapping cells served with different frequencies, for each cell, their own frequency is broadcasted to have higher priority. This way when UEs perform cell reselection, they are more likely to reselect their former frequency. Thus, less inter-frequency handover signaling overhead is incurred.

The patent publication US 2013/0003548 A1 provides for a method for improved load balancing in communication networks. The aim is to consider the backhaul capacity as well in load balancing. In one method, the packet loss for traffic between first network node and second network node is used to determine the load balancing necessity. Network nodes may be eNodeB, Packet Gateway (PGW), Serving Gateway (SGW), etc. Packet loss may be Ethernet frame loss, just the packet loss for high priority traffic, etc. In another method, the loading level due to traffic between a network node and the mobile devices served by this node is used as a metric.

The patent publication US 2011/0176424 A1 discloses a method to take into account UE and/or network capabilities when building the mapping tables for networks, to be used in cell reselection. Furthermore, the mapping table is based on the operator policy and network deployment conditions. A priority list is obtained by looking up the mapping table with the subscriber profile identification and UE capability. The mapping table is preferably updated for load balancing.

The U.S. Pat. No. 8,954,071 B2 discloses a method where subscription related information of each user is utilized in any mobility or radio resource management related procedure/decisions, both in idle and active mode. Subscriber type points to locally stored handling rules to be applied in the RAN. The rules are defined in eNB by means of configuration files.

The patent publication US 2009/0163223 A1 discloses a method for load balancing in mobile networks. Different load balancing variables, such as thresholds, etc., are provided for different traffic types, such that delay sensitive traffic avoids unnecessary handovers while delay insensitive traffic might be handed over for load balancing. Load balancing is first triggered for low priority traffic.

The patent EP 2781123 A1 discloses methods, apparatus and computer programs for performing MRO and MLB for only a subset of user equipment. The users served by a cell access node is partitioned into at least two groups according to at least one partitioning criterion, and MLB operations are performed between two access nodes of the network considering only one group of users identified by a group indicator information, which is sent to the neighboring cell via a message. Partitioning may be based on QoS criterion or UE capabilities. QoS criterion may be based on if UE has any real-time radio bearers or only non-real-time. QoS may also be based on QoS Class Identifier (QCI). Furthermore, messages in MRO root cause analysis are extended with group identification information. As such, Key Performance Indicators (KPIs) can be computed separately with respect to group indicator information.

Embodiments of the present invention are an improvement over prior art systems and methods.

SUMMARY OF THE INVENTION

In one embodiment, the present invention provides a mobility load balancing (MLB) and mobility robustness optimization (MRO) joint optimization module implementing handover (HO) parameter optimization by communicating with a radio access network (RAN) controller, the joint optimization module comprising: (a) an interpolator: receiving a measurement report associated with at least a base station serving a user equipment (UE) and at least one other base station in a neighborhood of the UE, the measurement report comprising: (1) signal strength or signal quality values as measured by a user equipment (UE), (2) other performance indicator values as measured by the UE, and (3) load values reported by each of the base stations; identifying one or more time instances that lack measurements of signal strength, signal quality, performance indicator, or load values, and interpolating values for the identified one or more time instances; (b) a storage unit storing the received measurement report and interpolated measurement values; (c) a MLB unit receiving the measurement report and outputting optimized HO parameters from a load balancing perspective to an optimizer; (d) a MRO unit receiving the measurement report and outputting optimized HO parameters based on reducing HO related link failures to an optimizer; and (e) an optimizer optimizing, jointly for both MLB and MRO, one or more HO parameters per user group based on: (1) stored measurement reports and interpolated measurement values, (2) output of the HO parameters computed by the MLB unit, and (3) the output of the HO parameters computed by the MRO unit, and (4) a set of weights used to multiply the HO parameters outputted by said MLB and MRO units, wherein a user group is a grouping of UEs.

In another embodiment, the present invention provides for an article of manufacture comprising non-transitory computer storage medium storing computer readable program code which, when executed by a processor in a single node, implements a mobility load balancing (MLB) and mobility robustness optimization (MRO) joint optimization module implementing handover (HO) parameter optimization by communicating with a radio access network (RAN) controller, the medium comprising: (a) computer readable program code executed by the processor to implement an interpolator: receiving a measurement report associated with at least a base station serving a user equipment (UE) and at least one other base station in a neighborhood of the UE, the measurement report comprising: (1) signal strength or signal quality values as measured by a user equipment (UE), (2) other performance indicator values as measured by the UE, and (3) load values reported by each of the base stations; identifying one or more time instances that lack measurements of signal strength, signal quality, performance indicator, or load values, and interpolating values for the identified one or more time instances; (b) computer readable program code executed by the processor to store, in a storage, the received measurement report and interpolated values; and (c) computer readable program code executed by the processor to implement an optimizer optimizing one or more HO parameters per group based on stored measurement reports and interpolated values; (d) computer readable program code executed by the processor to implement a MLB unit receiving the measurement report and outputting optimized HO parameters from a load balancing perspective to an optimizer; (e) computer readable program code executed by the processor to implement a MRO unit receiving the measurement report and outputting optimized HO parameters based on reducing HO related link failures to an optimizer; and (f) computer readable program code executed by the processor to implement an optimizer optimizing, jointly for both MLB and MRO, one or more HO parameters per user group based on: (1) stored measurement reports and interpolated measurement values, (2) output of the HO parameters computed by the MLB unit, and (3) the output of the HO parameters computed by the MRO unit, and (4) a set of weights used to multiply the HO parameters outputted by said MLB and MRO units, wherein a user group is a grouping of UEs.

In yet another embodiment, the present invention provides a method as implemented in a mobility load balancing (MLB) and mobility robustness optimization (MRO) joint optimization module implementing handover (HO) parameter optimization by communicating with a radio access network (RAN) controller, the method comprising: (a) receiving, at an interpolator, a measurement report associated with at least a base station serving a user equipment (UE) and at least one other base station in a neighborhood of the UE, the measurement report comprising: (1) signal strength or signal quality values as measured by a user equipment (UE), (2) other performance indicator values as measured by the UE, and (3) load values reported by each of the base stations; (b) identifying one or more time instances that lack measurements of signal strength, signal quality, performance indicator, or load values; (c) interpolating values for the identified one or more time instances; (d) storing, in a storage unit, the received measurement report and interpolated measurement values; (e) receiving, at a MLB unit, the measurement report and outputting optimized HO parameters from a load balancing perspective to an optimizer; (f) receiving, at a MRO unit, the measurement report and outputting optimized HO parameters based on reducing HO related link failures; and (g) optimizing jointly for both MLB and MRO, via an optimizer, one or more HO parameters per user group based on: (1) stored measurement reports and interpolated measurement values, (2) output of the MLB module, and (3) the output of the MRO module, wherein a user group is a grouping of UEs.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 1 describes the architecture of the proposed invention. A plurality of user equipment (UEs) is connected to a serving station. There may exist several user groups and the said UEs may belong to one or more of the user groups. There may also be only one user group, which is equivalent to not having any distinction among the UEs based on user groups. The UEs report measured signal strengths/qualities, and key performance indicators such as the radio link failure rate, and report these to the RAN controller as explained in the 3GPP standards. Future standards are expected to have equivalent parameters, and these are reported when these standards are used. Using the history of these reports, history of base station loads, as well as history of previous optimization results, the MLB and MRO joint optimization module optimizes a set of handover (HO) parameters per user group. The optimization goal is to achieve a desirable trade-off between the goals of the MLB and MRO functionalities and to arrive at a jointly optimal result, while taking into account the user group attributes. Then, these HO parameters are instructed to the UEs via the serving base station.

FIG. 2 describes the architecture of the proposed MLB and MRO joint optimization module. The unknown signal strength/quality and performance indicator values, due to lack of reports at some time instants, are first interpolated for each UE from known values. Then, full history of these parameters is stored in a storage unit such as a database. Similarly reported base station loads are also interpolated and stored. The results of previous HO parameter optimization operations are also stored in the storage. The MLB unit optimizes the HO parameters using the measurement results, performance indicators and base station (BS) loads for the goal of load balancing. The MRO unit separately optimizes the HO parameters using the same observations but for the goal of reducing link failures due to handover. The optimizer uses all information stored in the storage module and the HO parameters at the output of the MLB and MRO units to arrive at the jointly optimal HO parameter sets per each user group.

FIG. 4 describes the architecture of the optimizer module. The weights computation module computes the weights to be used to compute the jointly optimized HO parameters, given the histories of measurements, loads, and previously computed HO parameters. One set of weights per user group is computed. The combiner unit takes these weights and the results of the MLB and MRO optimization units, and computes the jointly optimized HO parameters for each user group. All computed weights and HO parameters are stored in the storage to be used in future optimizations.

FIG. 5 shows the operations of the weights computation unit. Whenever new measurements, loads, etc. arrive from the interpolator, a new set of weights are computed for each user group, for each HO parameter and for both MLB and MRO outputs. If a HO parameter does not exist in either of MLB or MRO's output, the corresponding weight is set to zero.

In FIG. 7a, if an incremental update is invoked, the weights computation unit uses the previously computed weights and HO parameters, as well as new observations such as signal qualities and performance indicators, to determine an incremental update on the weights. In FIG. 7b, the combiner uses these weights and MLB/MRO HO parameters from this round or previous round of optimization, to compute the jointly optimal HO parameters. Then the performance indicators due to these changes are observed and if desired outcomes are not achieved, the weights computation unit is invoked again for another incremental update.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

With the recent trends in mobile networks, such as growing data rates, increasing heterogeneity in services, etc., the operational costs have also exhibited similarly increasing trends. In order to compete with this, self-organizing networks (SON) concept has recently begun to find its place in modern telecommunication systems such as LTE. SON functionality aims to automate many management tasks within the network, minimize human intervention, dynamically self-optimize operational parameters and automatically recover from failures. As such, not only operational costs are reduced, but also human errors are minimized and network resources are used more efficiently.

Among the many SON functionalities, the ones that primarily deal with the handover (HO) parameters are Mobility Robustness Optimization (MRO) and Mobility Load Balancing (MLB.) In the LTE standard, the handover parameters are associated with the event A3, which is described in the measurement reporting section of 3GPP TS 36.331. Event A3 gets triggered if a neighbor cell's received signal strength becomes better than the serving cell by some specified offset parameters, and stays that way for a specified amount of time. When triggered, the user equipment (UE) sends a signal to the serving base station (BS) and the serving BS may respond with handover commands. Specifically, the event A3 gets triggered if $$M_s + O_{A3} + O_{fs} + O_{cs} + H < M_n + O_{fn} = O_{cn}, \quad (1)$$

where, $M_s$ and $M_n$ denote the measured RSRPs, $O_{fs}$ and $O_{fn}$ denote the frequency specific offsets (offsetFreq parameter in measObjectEUTRA), $O_{cs}$ and $O_{cn}$ denote the cell specific offsets (cellIndividualOffset parameter in measObjectEUTRA), H is a hysteresis parameter (hysteresis parameter in reportConfigEUTRA), and $O_{A3}$ is the offset parameter for the A3 event (a3-offset parameter in reportConfigEUTRA). Above, the subscripts s and n denote "serving cell" and "neighbor cell" respectively, for each of the defined parameters. In addition to the parameters above, the "time-to-trigger" (TTT) parameter is defined as the duration that condition (1) must be satisfied contiguously for triggering event A3. The leaving condition of the A3 event is given by $$M_s + O_{A3} + O_{fs} + O_{cs} + H > M_n + O_{fn} = O_{cn}, \quad (2)$$

Note the change of polarity of the hysteresis parameter. In the upcoming standards such as 5G, equivalent events, measurements and handover parameter definitions will be present. The invention is concerned in the optimization of the afore-mentioned handover parameters in an LTE network, or equivalent parameters related to handover in any standard.

The goal of MRO is to minimize handover related radio link failures and inefficient radio resource usage due to unnecessary or missed handovers. Specifically, MRO aims to minimize failures due to handovers that are too late, too early, or to a wrong cell. For this purpose, MRO specifies functionality to automatically optimize the offset parameters defined above, and cell reselection parameters. The cell reselection parameters are related to UE procedures in idle mode and defined in 3GPP TS 36.304. This invention considers UEs already connected to a serving BS, thus the handover parameters are considered.

On the other hand, the MLB functionality optimizes the handover parameters for the goal of load balancing between the neighbor cells. This functionality deals with both inter-RAT and intra-LTE load balancing. However, this invention considers the intra-LTE load balancing functionality. It is stated in the 3GPP TS 36.304 that the load balancing should not affect the user Quality of Service (QoS) negatively beyond what would be experienced at normal mobility. However, handovers due to load balancing may occur prematurely. That is, they may occur before any significant loss at received signal strength, and thus, may cause higher probability of link failure. Moreover, since both MLB and MRO functionalities optimize the same parameters, conflicts between the desired outputs between these two functionalities may cause waste of network resources and/or instability. Therefore, joint optimization of or coordination between MRO and MLB is necessary.

The network operator or service provider that serves a plurality of subscribers defines a user group for said plurality of subscribers and controls the corresponding handover parameters for the said user group. The grouping of users or flows of users into user groups may be in one or more of the following ways:

In an environment where one mobile network operator (MNO) and one of more mobile virtual network operators (MVNOs) utilize the same spectrum, users may be grouped according to their network operator subscriptions, Users may be grouped according to their service subscription profiles, Users may be grouped according to their geography and time specific radio resource reservation requests, Flows of users may be grouped according to flow profiles where a flow profile includes but is not limited to the following: flow type, flow header contents, over-the-top service provider identity.

The invention is concerned with the specification of system and methods for the joint optimization of the handover parameters in a manner that achieves coordination and a desirable trade-off between the goals of the MLB and MRO functionalities. Moreover, there may be multiple user groups as defined above, that the UEs belong to. In this case user groups' attributes are taken into account and a separate set of optimal parameters are produced for each group, where a jointly optimal solution is reached. This way, both the desired load balancing and minimal impact on link failures goals can be achieved.

In patent EP 2781123 A1, UEs are partitioned into at least two groups based on criteria such as QoS, UE capability, etc., and MLB or MRO functionality is applied to only one of the partitioned groups. This way, MLB and MRO functionality can be partially decoupled, which helps resolve the conflict mentioned above. This invention on the other hand, discloses system and methods where joint optimization of both MLB and MRO functionalities is performed, while taking into account user group attributes toward reaching a desirable trade-off or to a jointly optimal operational point. Moreover, this invention enables to form user groups based on a set of attributes, which allows a richer and more flexible way of categorizing the UEs rather than partitioning. For example, according to the invention, a UE may belong to more than one user group, or a user may belong to different groups at different times or locations.

Figure 1:
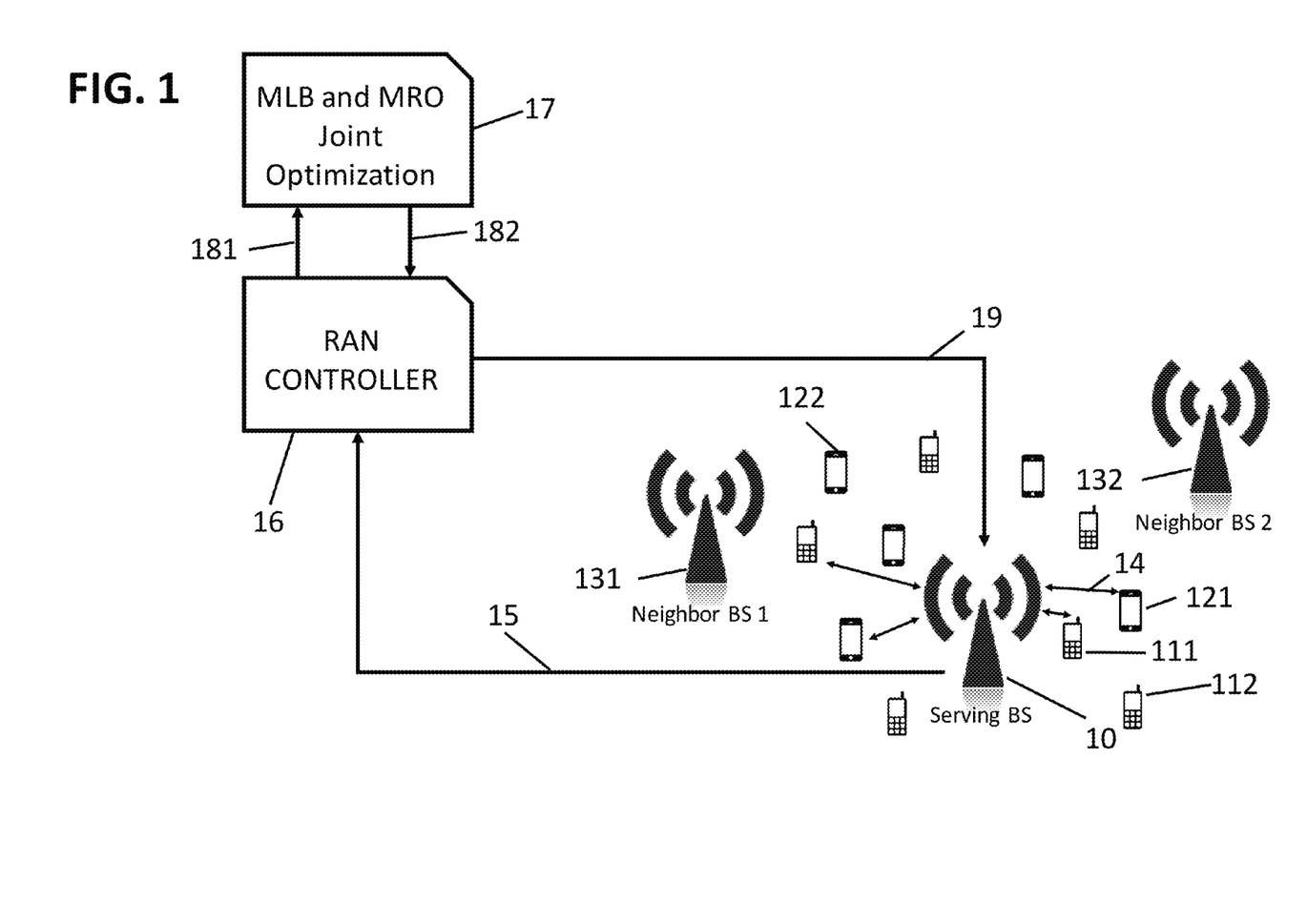

The architecture proposed by the invention is depicted in FIG. 1. In the figure, plurality of user equipment (UE) such as (111), (112), (121), (122) are connected to a serving base station (10). There may exist different user groups, as defined in the "summary of the invention and the advantages" section, that the said UEs belong to. In the figure, as an example, two user groups are depicted by using different icons for the UEs, such that the UEs (111) and (112) belong to one user group and (121) and (122) belong to another user group. It may also be the case that a UE may belong to more than one user group, or a UE may belong to different user groups at different times or locations. On the other hand, there may not be any distinction of the UEs based on the user groups, which is equivalent to all UEs belonging to the same user group. Thus, the invention's user group definition covers all of these cases.

All UEs periodically measure received signal strengths/qualities from all base stations, that is, from serving (10) and neighbor base stations (131), (132), and construct signal strength/quality indicators such as the Reference Signals Received Power (RSRP) and Reference Signals Received Quality (RSRQ) values as defined in the 3GPP standards or in the form of equivalent indicators in any future standard. These measurements are reported to the serving base station (14) and to the RAN controller (16), either periodically or in an event-triggered fashion. For example, in the LTE standard, the A3 event triggers the reporting of these measurements. The invention is not limited to any standard, however. Additionally, the performance indicators associated with handover events are also reported by the UEs to the RAN controller via the serving base station. For example, in the LTE standard, such performance indicators may be handover failure rate, radio link failure rate, etc. In future standards, equivalent performance indicators are assumed to be reported. Additionally, base station loads, in terms of number of UEs served, total computational, energy, memory, wireless resource usage levels of the base station, etc., are also reported to the RAN controller.

The RAN controller forwards the measurement reports, the performance indicators and base station loads (181) to the MLB and MRO joint optimization module (17) proposed by this invention. If more than one user group exists, the user group attributes such as priority, traffic type, equipment capability, etc. are also made available by the RAN controller to the MLB and MRO joint optimization module. This module produces optimized HO parameter sets, either consisting of the offset parameters, hysteresis parameter and time to trigger parameter as defined in the 3GPP standards, or consisting of equivalent parameters of future standards. If more than one user group exists, one optimal set of parameters per user group is produced. Then this information is sent back (182) to the RAN controller. The RAN controller then updates the UEs with their associated group's HO parameters (19) via the serving base station. If a UE is associated with more than one user group, then the RAN controller may decide which set of HO parameters to be sent to that UE.

The goal of the MLB functionality is to improve cellular network's performance and resource usage efficiency through load balancing. This is achieved by handing over some UEs from heavily loaded cells to less loaded cells, by optimizing the handover parameters that are explained above. On the other hand, the MRO functionality aims to reduce handover related radio link failures. Specifically, the MRO functionality aims to detect too early and too late handovers, and handovers to wrong cells and takes corrective action by optimizing the handover parameters. Since both MLB and MRO functionalities optimize the same parameters, conflicts between these two functionalities may cause waste of network resources and/or instability. Therefore, joint optimization of or coordination between MRO and MLB functionalities is necessary. Moreover, if multiple user groups exist, their attributes must be taken into account in the optimization, such that different sets of optimal handover parameters are produced for each group, where a jointly optimal solution is reached. For example, for a user group that is defined to mainly consist of flows that are robust to temporary link failures, (such as file download) the handover parameters for this group might be adjusted to allow for earlier handoffs while allowing UEs with time-critical flows to stay at their serving base stations. This way, both the desired load balancing and minimal impact on link failures goals can be achieved. This invention proposes the unit labeled "MLB and MRO joint optimization module" (17) in the architecture to achieve these goals.

Figure 2:
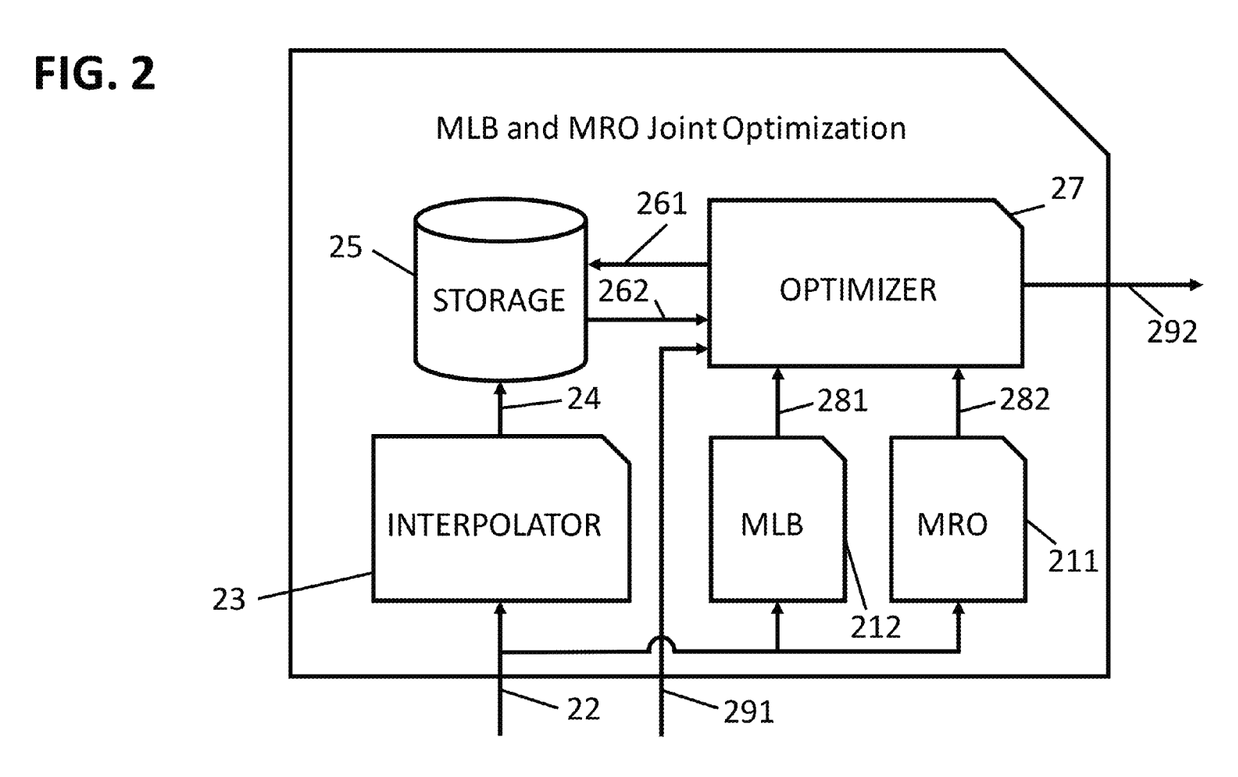

The architecture of the MLB and MRO joint optimization module is given in FIG. 2. The measurement reports and performance indicators from the UEs and the BS loads are first passed (22) from the RAN controller to the interpolator module (23). The interpolator's duty is to construct a history of such parameters for all UEs. Said parameters may be not reported at all time instants. The interpolator interpolates the values of such time instants from the known values. Then complete histories of the measured signal strengths/qualities and performance indicators are passed (24) to a storage unit (25) such as a database.

The measurement reports, performance indicators from the UEs and BS loads are also passed (22) from the RAN controller to the MLB (212) and MRO (211) modules. These modules may exist within the SON functionality of the network. In another embodiment, one or both of these functionalities may be implemented as parts of the proposed system. The MLB module optimizes the HO parameters with the goal of load balancing. The MRO module optimizes the HO parameters with the goal of reducing HO related link failures. Since these functionalities have different goals, their outputs are expected to be different.

Figure 5:
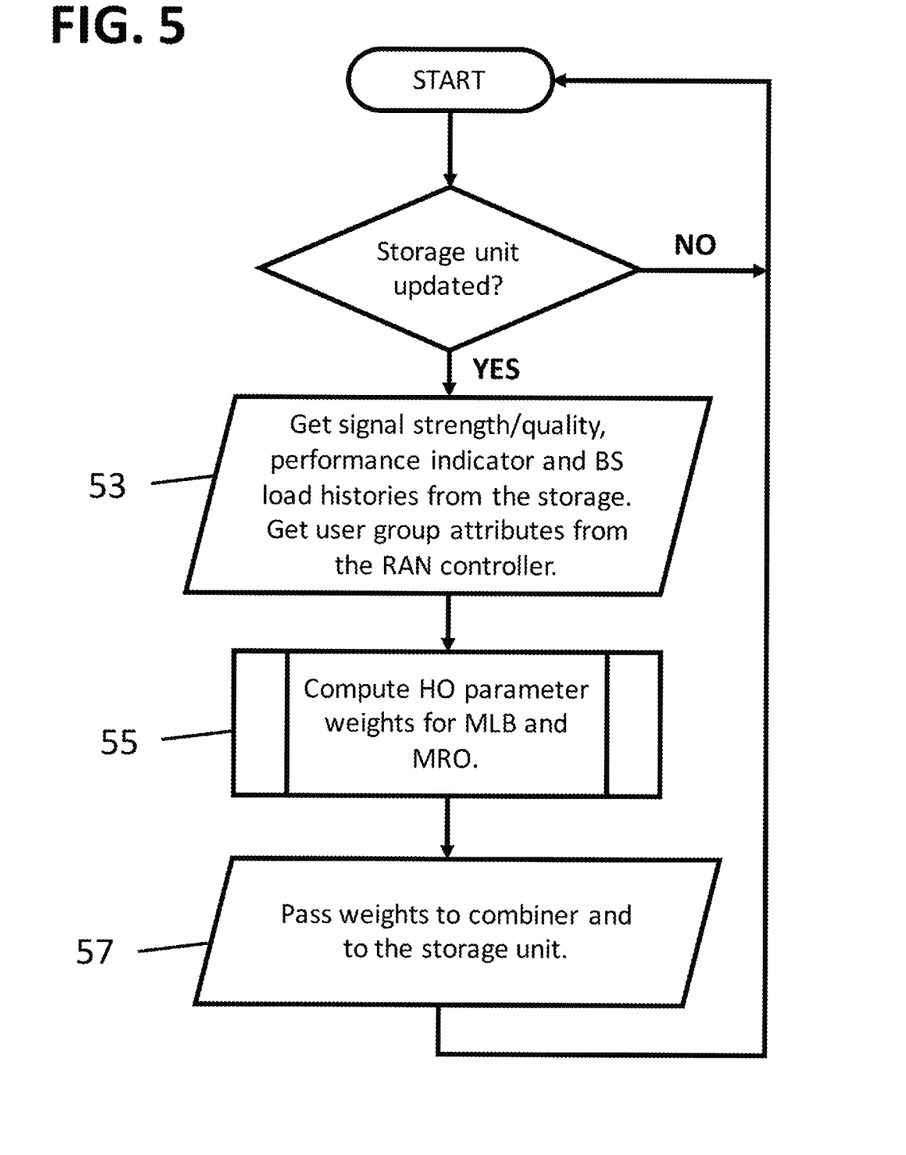

Both sets of HO parameters obtained from MLB and MRO are passed (281), (282) to the optimizer module (27). The optimizer module also accesses the history of measured signal strengths/qualities, performance indicators and BS loads from the storage unit (262) and user group attributes from the RAN controller (291). Using the said information as input, the optimization module optimizes the HO parameters for each user group jointly. The optimized HO parameters are then sent back (292) to the RAN controller. HO parameters obtained from MLB and MRO units, and weights used in the computation of jointly optimized HO parameters, which are explained further in FIG. 5, are also stored in the storage unit (261) to be used in future optimizations.

Figure 3:
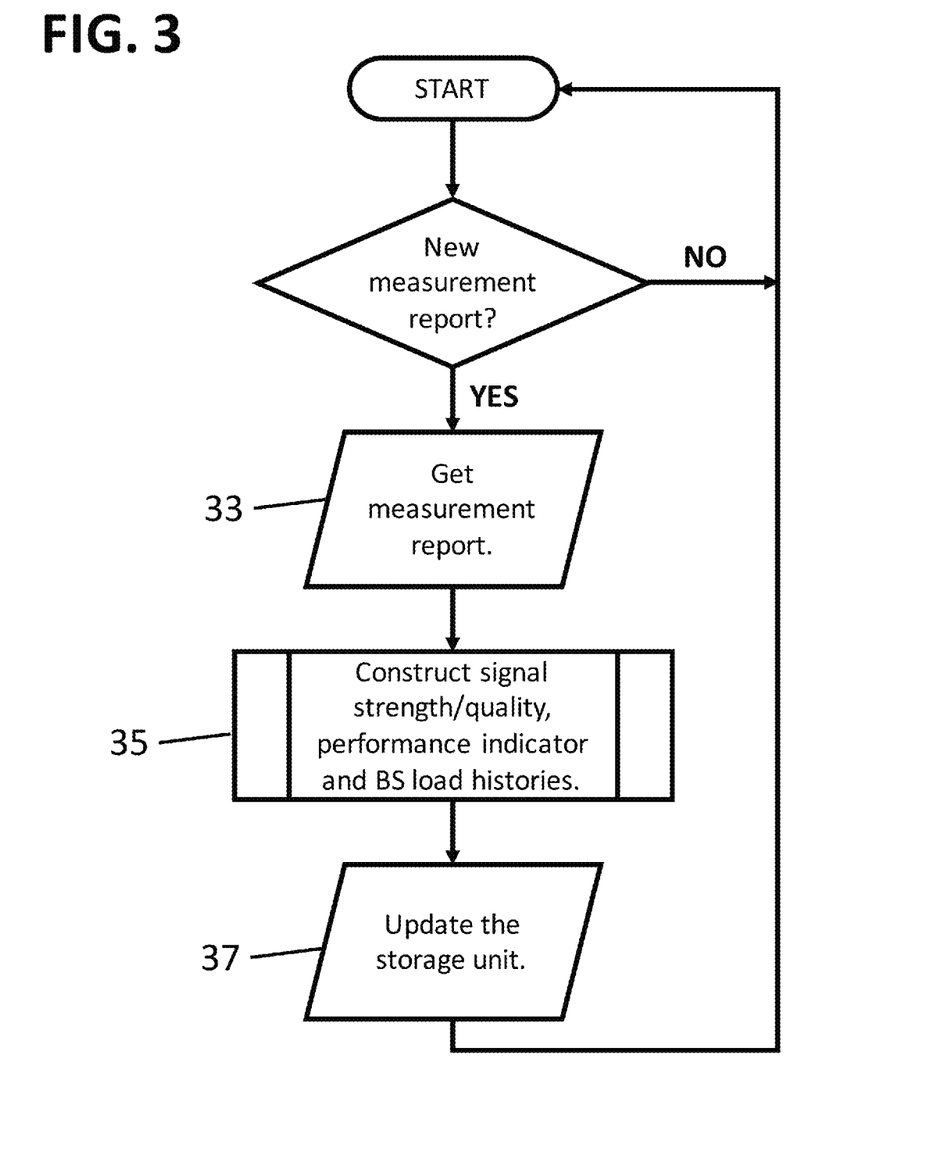
FIG. 3 describes the operations of the interpolator module.

FIG. 3 describes the operation of the interpolator module (23). Whenever a new measurement for an UE or a BS arrives, the interpolator first acquires this report from the RAN controller (33). Then according to the time stamp of the report and the sampling interval adopted for the parameter histories, it interpolates the missing values to construct the signal strength/quality, performance indicator and BS load histories (35). Then the new information is incorporated into the storage element (37).

Figure 4:
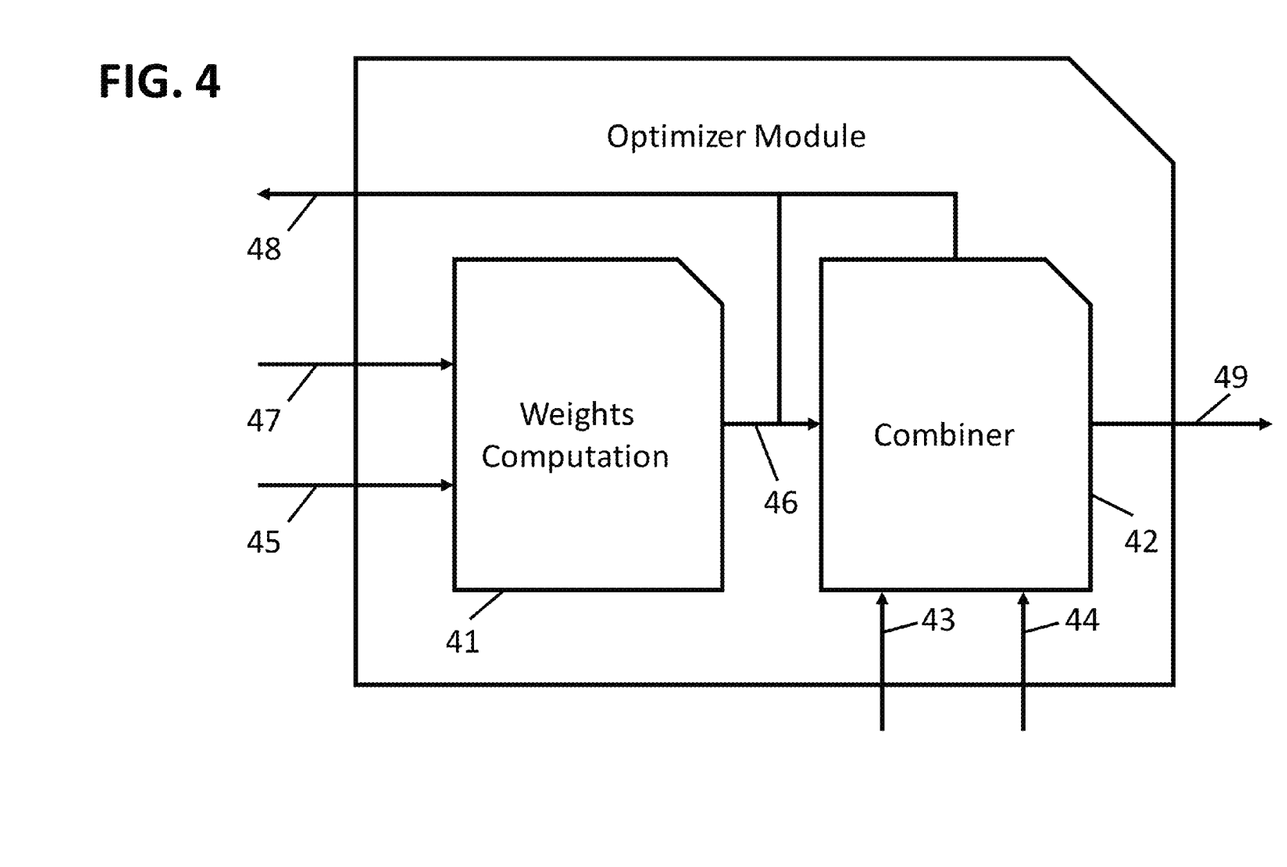

FIG. 4 describes the architecture of the optimizer module (27). The inputs of this unit are the histories of the measured signal strengths/qualities, performance indicators, BS loads and previously used MLB/MRO HO parameters and weights, which are all obtained from the storage unit (47), the user group attributes, which are obtained from the RAN controller (45), and the HO parameters, which are obtained from the MLB and MRO units (43), (44). The outputs are sets of optimized HO parameters for each user group (49) and weights that are used in the computation of said parameters (48). Additionally the HO parameters obtained from the MLB and MRO units are also stored in the storage unit to use in the future optimizations (48).

We assume there are K user groups and N HO parameters per user group. Therefore a total of KN parameters are jointly optimized. If there exist parameters that are optimized by only MRO or by only MLB, the union of the parameters from both units is considered to be the parameter set of the overall optimization. As such, N is the number of parameters in the union. Given the inputs, first a set of weights to be used with the outputs of the MLB and MRO units are computed (41) and passed (46) to the combiner unit (42). These weights are also sent back to the storage unit to be used in future optimizations (48). The combiner unit combines the outputs of the MLB and MRO units into jointly optimized HO parameters using these weights. Jointly optimal HO parameters are then sent to the RAN controller (49).

The operations of "weights computation" are given in FIG. 5. Whenever the storage unit is updated with new measurements, this unit gets the histories of the measured signal strengths/qualities, performance indicators and BS loads from the storage unit and the user group attributes from the RAN controller (53). Then it computes (55) a set of weights $w_{R,k,i}$ and $w_{L,k,i}$ for i=1, 2, . . . , N and k=1, 2, . . . , K. $w_{R,k,i}$ denotes the weight to be used for the $k^{th}$ user group for the $i^{th}$ HO parameter coming from the MRO unit. $w_{L,k,i}$ denotes the weight to be used for the $k^{th}$ user group for the $i^{th}$ HO parameter coming from the MLB unit. If $i^{th}$ parameter is not optimized by a unit, its weight is assumed to be zero for that unit. As an example, for a user group with time critical flows, if the signal quality history shows that the future trend of the signal quality to the serving base station has lower probability of degradation, then $w_{R,k,i}$ values might be chosen to be higher than $w_{L,k,i}$ for that group. On the other hand, if the signal quality to the serving base station shows a consistent trend of degradation while the signal quality to another base station shows a consistent trend of improvement, then handover to the improving base station should be encouraged, lower $w_{R,k,i}$ values might be chosen compared to $w_{L,k,i}$. Finally the computed weights are passed to the combiner unit, as well as, stored in the storage unit to be used in future optimizations (57).

Figure 6:
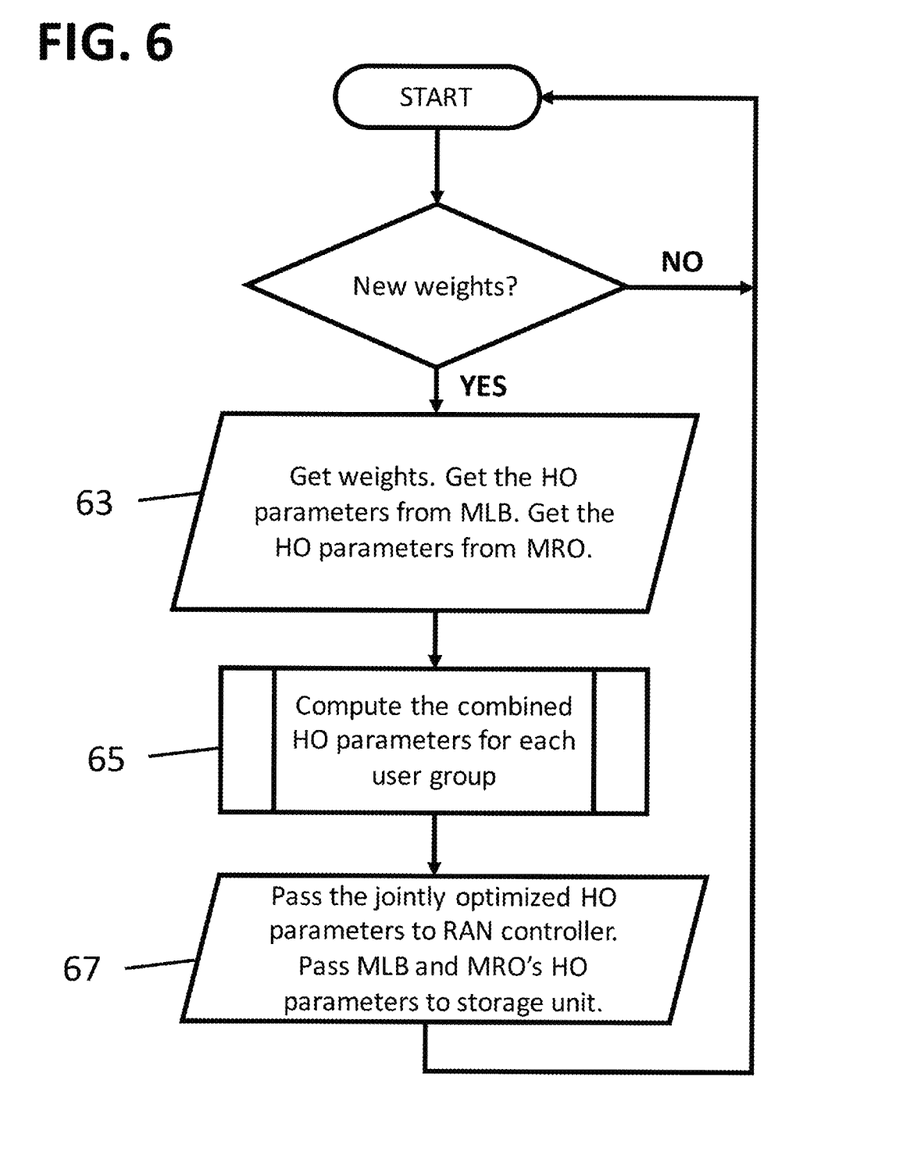
FIG. 6 shows the operation of the combiner unit. This unit combines the outputs of the MLB and MRO units linearly using the weights supplied by the weights computation unit.

FIG. 6 shows the operations of the combiner unit. Whenever new weights are available from the "weights computation" unit, these weights are used to compute the jointly optimized HO parameters. Assume $x_{R,i}$ is the $i^{th}$ handover parameter obtained from the MRO unit and assume $x_{L,i}$ is the $i^{th}$ handover parameter obtained from the MLO unit. If $i^{th}$ parameter is not optimized by MRO or MLB, $x_{R,i}$ or $x_{L,i}$ is assumed to be zero, respectively. Then the overall, jointly optimized HO parameter $y_{k,i}$ for the $k^{th}$ user group is computed (65) according to $y_{k,i} = w_{R,k,i} x_{R,i} + w_{L,k,i} x_{L,i}$. Resulting $y_{k,i}$ values are passed to the RAN controller. $x_{R,i}$ and $x_{L,i}$ for $i=1, 2, \ldots, N$, are passed to the storage unit to be stored in the future optimizations (67).

Figure 7A:
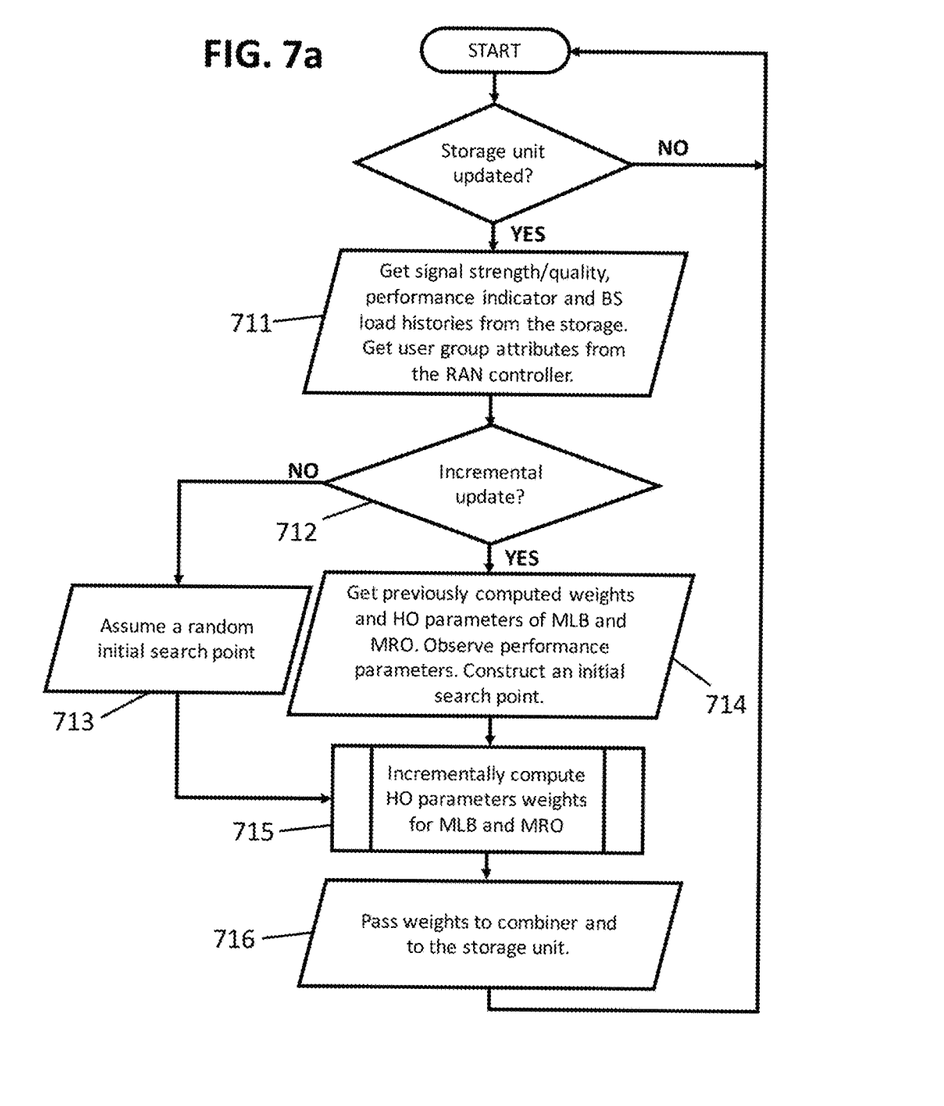
FIGS. 7A-7B show the operations of the weights computation and the combiner units in a preferred embodiment, where the performance indicators resulting from the handover actions due to optimized HO parameters are used as feedback to incrementally and iteratively optimize for the HO parameters. In this embodiment, the storage unit is assumed to additionally store a variable updated by the combiner unit that invokes the weights computation unit if an incremental update is requested.
Figure 7B:
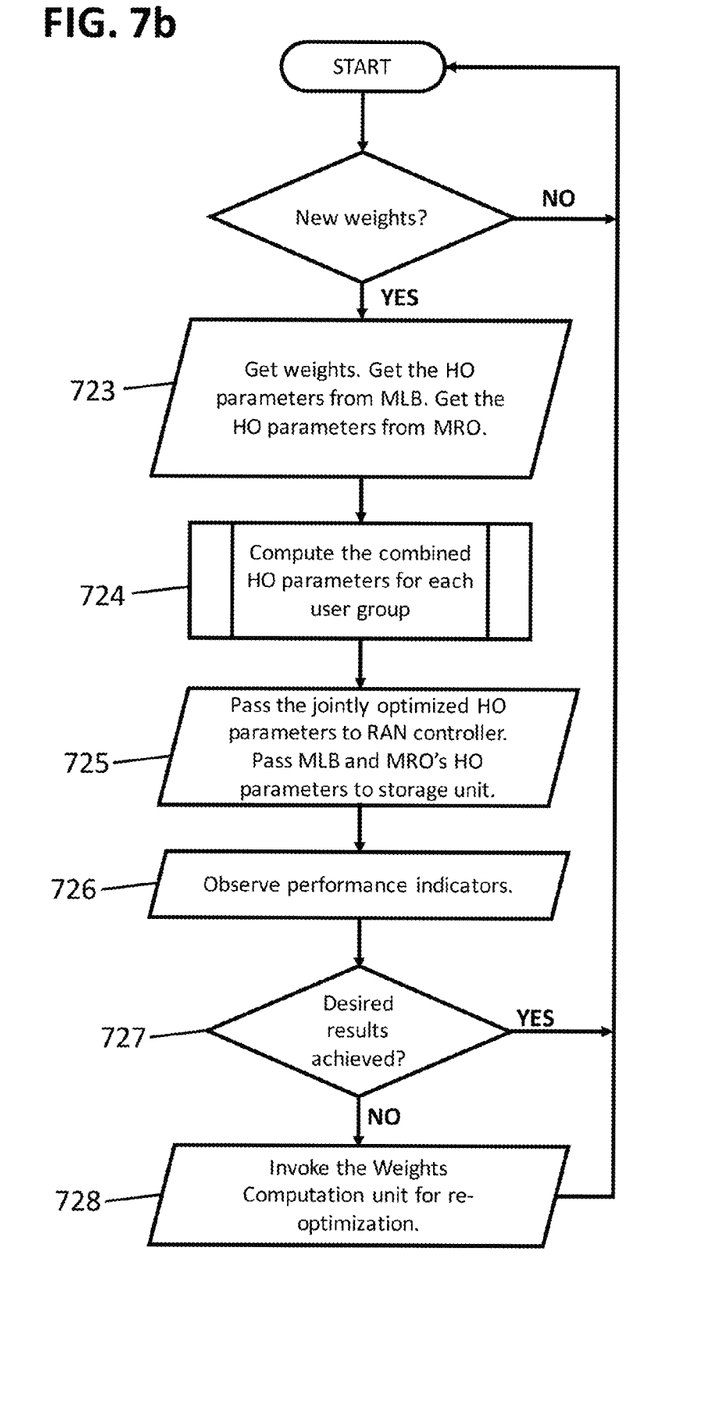

In the preferred embodiment, the optimization is done in an incremental and iterative fashion, using the observed key performance indicators and base station loads as feedback. This is shown in FIGS. 7a and 7b. In this embodiment, the storage unit is assumed to additionally store a variable updated by the combiner unit that invokes the weights computation unit if an incremental update is requested.

FIG. 7a shows the operations of the weights computation unit. Whenever the storage unit is updated with new measurements or whenever the said incremental update variable gets invoked, the weights computation unit gets the histories of the measured signal strengths/qualities, performance indicators and BS loads from the storage unit and the user group attributes from the RAN controller (711). If an incremental update is not requested (that is, the optimization is to be performed solely based on changes on signal qualities, loads, etc.) (712), then an initial search point that is randomly determined is chosen for the optimization (713). The distribution of the random point should take into account the properties of the system at hand. For example, if the expected ranges of values are determined for the weights, the initial search point may be uniform within those ranges. The distribution may also be adopted dynamically depending on the information available at the storage unit. If an incremental update is requested (712), then the previously used MLB and MRO outputs and their weights, which were stored in the storage unit in the previous round of optimization, are acquired. Observed performance indicators as a result of the previous round of optimization, which are reported by the UEs and updated in the storage by the interpolator unit, are also acquired (714). At this point the initial search point may simply be the previously used weights, or a more complicated function of the previously used weights taking into account the HO parameters and resulting performance indicators. Then, a set of weights is computed incrementally using the initial search point (715), and passed to the combiner and storage units (716). The feedback to re-trigger the iterative optimization will come from the combiner unit, as will be explained next.

FIG. 7b shows the operations of the combiner unit under the preferred embodiment. Whenever new weights come from the weights computation unit, new set of jointly optimized handover parameters are computed according to $y_{k,i} = w_{R,k,i} x_{R,i} + w_{L,k,i} x_{L,i}$ (724). Here, the weights $w_{R,k,i}$ and $w_{L,k,i}$ come from the weights computation unit. In one embodiment, the parameters $x_{R,i}$ and $x_{L,i}$ are acquired from the MLB and MRO units at this optimization round. In another embodiment, $x_{R,i}$ and $x_{L,i}$ kept the same as the ones that were used in the previous optimization round. The jointly optimized HO parameters are passed to the RAN controller and the MLB and MRO HO parameters are passed to the storage unit (725). The effects of the handovers on the performance indicators are observed (726). If the desired results are not achieved (727), the variable in the storage is set to request an incremental update, which invokes the weights computation unit to perform an incremental update on the weights.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for programmable joint optimization of mobility load balancing (MLB) and mobility robustness optimization (MRO). While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific hardware.

The invention claimed is:

1. A mobility load balancing (MLB) and mobility robustness optimization (MRO) joint optimization module implementing handover (HO) parameter optimization by communicating with a radio access network (RAN) controller, the joint optimization module comprising:
    (a) an interpolator:
    receiving a measurement report associated with at least a base station serving a user equipment (UE) and at least one other base station in a neighborhood of the UE, measurement reports of measurement values comprising: (1) signal strength or signal quality values as measured by UE, (2) other performance indicator values as measured by the UE, and (3) load values reported by each of the base stations;
    identifying one or more time instances that lack measurements of signal strength, signal quality, performance indicator, and load values, and
    interpolating measurement values for the identified one or more time instances;
    (b) a storage unit storing the received measurement report and interpolated measurement values;
    (c) a MLB unit receiving the measurement report and outputting optimized HO parameters from a load balancing perspective to an optimizer;
    (d) a MRO unit receiving the measurement report and outputting optimized HO parameters based on reducing HO related link failures to an optimizer; and
    (e) an optimizer optimizing, jointly for both MLB and MRO, one or more HO parameters per user group based on: (1) stored measurement reports and interpolated measurement values, (2) output of the HO parameters computed by the MLB unit, and (3) the output of the HO parameters computed by the MRO unit, and (4) a set of weights used to multiply the HO parameters outputted by said MLB and MRO units, wherein a user group is a grouping of UEs.

2. The MLB and MRO joint optimization module of claim 1, wherein the optimizer comprises a weights computation unit and a combiner unit, wherein the weights computation unit computing a set of weights to be used with the outputs of the MLB and the MRO units and the combiner receiving the computed weights and the output of the MLB and NRO units and jointly optimizing HO parameters by multiplying with the computed weights.

3. The MLB and MRO joint optimization module of claim 2, wherein HO parameters obtained from the MLB and the MRO units are also stored in the storage unit for future optimizations.

4. The MLB and MRO joint optimization module of claim 2, wherein whenever the storage unit is updated with new measurements, the weights computation unit gets the histories of measured signal strengths/qualities, performance indicators and BS loads from the storage unit and user group attributes from the RAN controller, and computes a set of weights w_(R,k,i) and w_(L,k,i), for i=1, 2, . . . , N and k=1, 2, . . . , K, wherein w_(R,k,i) denotes the weight to be used for the k^th user group for the i^th HO parameter coming from the MRO unit and w_(L,k,i) denotes the weight to be used for the k^th user group for the i^th HO parameter coming from the MLB unit.

5. The MLB and MRO joint optimization module of claim 4, wherein whenever new weights are available from the weights computation unit, the combiner unit uses them to compute the jointly optimized HO parameters, wherein when x_(R,i) is the i^th handover parameter obtained from the MRO unit and x_(L,i) is the i^th handover parameter obtained from the MLO unit, and when i^th parameter is not optimized by the MRO or MLB units, x_(R,i) or x_(L,i) is assumed to be zero, and an overall, jointly optimized HO parameter y_(k,i) for the k^th user group is computed according to y_(k,i)=w_(R,k,i) 〚 x 〛_(R,i)+w_(L,k,i) 〚 x 〛_(L,i), with . resulting y_(k,i) values being passed to the RAN controller and x_(R,i) and x_(L,i), for i=1, 2, . . . , N, are passed to the storage unit to be stored for future optimizations.

6. The MLB and MRO joint optimization module of claim 5, wherein weights w_(R,k,i) and w_(L,k,i) come from the weights computation unit and 〚 x 〛_(R,i) and 〚 x 〛_(L,i) are acquired from the MLB and MRO units at this optimization round.

7. The MLB and MRO joint optimization module of claim 5, wherein 〚 x 〛_(R,i) and 〚 x 〛_(L,i) are kept same as the ones that were used in the previous optimization round.

8. The MLB and MRO joint optimization module of claim 1, wherein the load values of a base station are any of, or a combination of, the following: total number of UEs served, total computational power, total computational memory of, and the wireless resource usage levels of that base station.

9. The MLB and MRO joint optimization module of claim 1, wherein only one set of HO parameters are first optimized generally for all groups and, subsequently, adjusting the one set of HO parameters to generate another set of parameters for a given user group, taking into account attributes associated with that given user group.

10. The MLB and MRO joint optimization module of claim 1, wherein the UE may belong to any of the following: a single user group, more than one user group, or to different user groups at different times.

11. An article of manufacture comprising non-transitory computer storage medium storing computer readable program code which, when executed by a processor in a single node, implements a mobility load balancing (MLB) and mobility robustness optimization (MRO) joint optimization module implementing handover (HO) parameter optimization by communicating with a radio access network (RAN) controller, the medium comprising:
  (a) computer readable program code executed by the processor to implement an interpolator:
    receiving a measurement report associated with at least a base station serving user equipment (UE) and at least one other base station in a neighborhood of the UE, measurement reports of measurement values comprising: (1) signal strength or signal quality values as measured by UE, (2) other performance indicator values as measured by the UE, and (3) load values reported by each of the base stations;
    identifying one or more time instances that lack measurements of signal strength, signal quality, performance indicator, and load values, and
    interpolating measurement values for the identified one or more time instances;
  (b) computer readable program code executed by the processor to store, in a storage, the received measurement report and interpolated values; and
  (c) computer readable program code executed by the processor to implement an optimizer optimizing one or more HO parameters per group based on stored measurement reports and interpolated values;
  (d) computer readable program code executed by the processor to implement a MLB unit receiving the measurement report and outputting optimized HO parameters from a load balancing perspective to an optimizer;
  (e) computer readable program code executed by the processor to implement a MRO unit receiving the measurement report and outputting optimized HO parameters based on reducing HO related link failures to an optimizer; and
  (f) computer readable program code executed by the processor to implement an optimizer optimizing, jointly for both MLB and MRO, one or more HO parameters per user group based on: (1) stored measurement reports and interpolated measurement values, (2) output of the HO parameters computed by the MLB unit, and (3) the output of the HO parameters computed by the MRO unit, and (4) a set of weights used to multiply the HO parameters outputted by said MLB and MRO units, wherein a user group is a grouping of UEs.

12. A method as implemented in a mobility load balancing (MLB) and mobility robustness optimization (MRO) joint optimization module implementing handover (HO) parameter optimization by communicating with a radio access network (RAN) controller, the method comprising:
  (a) receiving, at an interpolator, a measurement report associated with at least a base station serving user equipment (UE) and at least one other base station in a neighborhood of the UE, the measurement report comprising: (1) signal strength or signal quality values as measured by UE, (2) other performance indicator values as measured by the UE, and (3) load values reported by each of the base stations;
  (b) identifying one or more time instances that lack measurements of signal strength, signal quality, performance indicator, and load values;
  (c) interpolating measurement values for the identified one or more time instances;
  (d) storing, in a storage unit, the received measurement report and interpolated measurement values;
  (e) receiving, at a MLB unit, the measurement report and outputting optimized HO parameters from a load balancing perspective to an optimizer;
  (f) receiving, at a MRO unit, the measurement report and outputting optimized HO parameters based on reducing HO related link failures; and
  (g) optimizing jointly for both MLB and MRO, via an optimizer, one or more HO parameters per user group based on: (1) stored measurement reports and interpolated measurement values, (2) output of the MLB module, and (3) the output of the MRO module, wherein a user group is a grouping of UEs.

13. The method of claim 12, wherein the optimizer comprises a weights computation unit and a combiner unit, wherein the weights computation unit computes a set of weights to be used with the outputs of the MLB and the MRO units and the combiner receives the computed weights and the output of the MLB and NRO units and jointly optimizes HO parameters using the computed weights.

14. The method of claim 13, wherein HO parameters obtained from the MLB and the MRO units are also stored in the storage unit for future optimizations.

15. The method of claim 13, wherein whenever the storage unit is updated with new measurements, the weights computation unit gets the histories of measured signal strengths/qualities, performance indicators and BS loads from the storage unit and user group attributes from the RAN controller, and computes a set of weights $w\_(R,k,i)$ and $w\_(L,k,i)$, for $i=1, 2, \ldots, N$ and $k=1, 2, \ldots, K$, wherein $w\_(R,k,i)$ denotes the weight to be used for the $k$^th user group for the $i$^th HO parameter coming from the MRO unit and $w\_(L,k,i)$ denotes the weight to be used for the $k$^th user group for the $i$^th HO parameter coming from the MLB unit.

16. The method of claim 15, wherein whenever new weights are available from the weights computation unit, the combiner unit uses them to compute the jointly optimized HO parameters, wherein when $x\_(R,i)$ is the $i$^th handover parameter obtained from the MRO unit and $x\_(L,i)$ is the $i$^th handover parameter obtained from the MLO unit, and when $i$^th parameter is not optimized by the MRO or MLB units, $x\_(R,i)$ or $x\_(L,i)$ is assumed to be zero, and an overall, jointly optimized HO parameter $y\_(k,i)$ for the $k$^th user group is computed according to $y\_(k,i)=w\_(R,k,i) \llbracket x \rrbracket \_(R,i)+w\_(L,k,i) \llbracket x \rrbracket \_(L,i)$, with . resulting $y\_(k,i)$ values being passed to the RAN controller and $x\_(R,i)$ and $x\_(L,i)$, for $i=1, 2, \ldots, N$, are passed to the storage unit to be stored for future optimizations.

17. The method of claim 15, wherein weights $w\_(R,k,i)$ and $w\_(L,k,i)$ come from the weights computation unit and $\llbracket x \rrbracket \_(R,i)$ and $\llbracket x \rrbracket \_(L,i)$ are acquired from the MLB and MRO units at this optimization round.

18. The method of claim 15, wherein $\llbracket x \rrbracket \_(R,i)$ and $\llbracket x \rrbracket \_(L,i)$ are kept same as the ones that were used in the previous optimization round.

19. The method of claim 12, wherein the UE may belong to any of the following: a single user group, more than one user group, or to different user groups at different times.

20. The method of claim 12, wherein the load values of a base station are any of, or a combination of, the following: total number of UEs served, total computational power, total computational memory of, and the wireless resource usage levels of that base station.

* * * * *